(12) United States Patent
Endo et al.

(10) Patent No.: US 6,335,796 B1
(45) Date of Patent: *Jan. 1, 2002

(54) IMAGE PICK-UP APPARATUS, IMAGE PICK-UP METHOD, AND IMAGE PICK-UP SYSTEM

(75) Inventors: Yutaka Endo; Hiroyuki Matsuno, both of Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,440

(22) Filed: Dec. 19, 1997

(30) Foreign Application Priority Data

Dec. 20, 1996 (JP) .............................. 8-354993

(51) Int. Cl.⁷ .............................................. G06F 15/00
(52) U.S. Cl. .................................. 358/1.15; 128/653.1
(58) Field of Search ............................... 395/114, 116, 395/117, 101, 109; 358/1.15, 1.16, 1.17; 128/653.1

(56) References Cited

U.S. PATENT DOCUMENTS

| | | | |
|---|---|---|---|
| 4,810,881 A | 3/1989 | Berger et al. | 250/370.01 |
| 5,132,539 A | 7/1992 | Kwasnick et al. | 250/361 R |
| 5,228,118 A * | 7/1993 | Sasaki | 395/112 |
| 5,381,014 A | 1/1995 | Jeromin et al. | 250/370.09 |
| 5,396,072 A | 3/1995 | Schiebel et al. | 250/370.09 |
| 5,418,377 A | 5/1995 | Tran et al. | 250/483.1 |
| 5,551,428 A * | 9/1996 | Godlewski et al. | 128/653.1 |
| 5,564,109 A | 10/1996 | Snyder et al. | 395/828 |
| 5,596,416 A | 1/1997 | Barry et al. | 358/296 |
| 5,734,915 A * | 3/1998 | Roewer | 395/773 |

FOREIGN PATENT DOCUMENTS

GB 2088671 6/1982

* cited by examiner

*Primary Examiner*—Joseph Mancuso
*Assistant Examiner*—Douglas Tran
(74) *Attorney, Agent, or Firm*—Fitzpatrick, Cella, Harper & Scinto

(57) ABSTRACT

Disclosed is an image pick-up apparatus system using large-screen image pick-up means, which system comprises: image pick-up means; detecting means for detecting the state of one or more image output devices connected to the apparatus via a network; and control means for controlling the exposure area defined by the image pick-up means, according to the detection output of the detecting means, in order to increase ease of use of the operator, and realized increased speed of processing. Also disclosed is an image pick-up apparatus which comprises: image pick-up means; detecting means for detecting the state of the plurality of image output devices connected to the apparatus via the network; and setting means for setting the output device for outputting the image signals exposed by the image pick-up means, according to the detection output of the detecting means.

13 Claims, 17 Drawing Sheets

FIG. 18

| | SPACE RESOLUTION | | DENSITY RESOLUTION | JOBS WAITING | PROCESSING TIME | TYPE |
|---|---|---|---|---|---|---|
| 4096 | 5120 | 80µm | 12bit | 1 | 30sec | SILVER HALIDE |
| 2048 | 2048 | 80µm | 10bit | 5 | 45sec | DRY SILVER |

FIG. 20

| | SPACE RESOLUTION | | DENSITY RESOLUTION | CONDITION 1 | CONDITION 2 |
|---|---|---|---|---|---|
| 2700 | 2700 | 160µm | 12bit | LIFE-SIZE | AREA OF CONCERN |
| 2700 | 2700 | 160µm | 12bit | DEGREE OF EMERGENCY | ALL |

IMAGE PICK-UP APPARATUS, IMAGE PICK-UP METHOD, AND IMAGE PICK-UP SYSTEM

BACKGROUND OF THE INVENTION

1. Field of the Invention

The present invention relates to an image pick-up apparatus, image pick-up method, and image pick-up system, and particularly to an image pick-up apparatus, image pick-up method, and image pick-up system preferably applied to X-ray image pick-up devices using two-dimensional solid sensors.

2. Description of Related Art

Generally, a method widely used in actual practice for industrial non-destructive testing and medical diagnosis involves exposure an object with radiation, and measuring the intensity distribution of the radiation which has transmitted the object, thus obtaining a radiograph. One generally used such image pick-up method for obtaining a radiograph involves combining silver halide film with intensifying screen or a phosphor which exhibits fluorescence under the presence of radiation, changing the radiation which has transmitted the object into visible light on the phosphor and forming a latent image on the silver halide film, following which the silver halide film is subjected to chemical processing so as to obtain a visible image. The analog radiograph obtained by this radiography method is used for diagnosis, inspection, and so forth.

On the other hand, progress in digital technology in recent years has led to obtaining high-quality radiographs with high diagnosis capabilities, by means of converting the radiograph into electrical signals (image signals) and subjecting the electrical signals to image processing, and then displaying on a CRT or the like as a visible image.

Also used are computed radiography apparatuses (CR apparatuses) which use an imaging plate coated with accelerated phosphoresce material serving as the fluorescent material. This method employs; the fact that when an imaging plate which has been subjected to primary excitation by radiation irradiation is subjected to secondary excitation by visible light such as red laser light or the like, the accelerated phosphoresce material emits light. The CR apparatus extracts a radiograph by detecting this photo-emission with a photo-sensor such as a photo-multiplier or the like, and outputs a visible image to the photography photosensitive material, CRT, or the like, based on this image data.

Further, more recently, technology has; been developed wherein a digital image is obtained by using image-receiving means comprised of a photo-electric converting device formed of picture elements of minute photo-electric converters and switching devices arrayed in a lattice-work. Such radiography apparatuses wherein fluorescent material is layered upon a CCD or amorphous silicone two-dimensional photo-electric converting device are disclosed in U.S. Pat. Nos. 5,418,377, 5,396,072, 5,381,014, 5,132,539, 4,810,881, etc.

Generally, radiography used for medical diagnosis requires reducing the amount of exposure to a minimal amount, while obtaining high-quality radiographs having maximum diagnosis capabilities. With the photography method using silver halide film/fluorescent plate or intensifying screen, the dynamic range of the radiation detecting device comprised of silver halide film/fluorescent plate or intensifying screen as to the amount of radiation is narrow, so in the event that the amount of radiation entering the silver halide film/fluorescent plate or intensifying screen is not appropriate, the resultant radiograph is either diagnosis. However, by means of using CR apparatuses and photo-electric converting devices, the image can be directly obtained as digital data, so ease of image processing is facilitated, and easy correction of inappropriate photography conditions and image enhancement of the range of concern is enabled.

Various types of large-area solid sensors have been commercially produced in recent years to served as photo-electric converting devices, such as described above. On the other hand, large-scale facilities are necessary for manufacturing such large-area solid sensors, so it is difficult to manufacture different types of sensors for each film size, and accordingly, a method generally employed involves manufacturing only one type of large-scale solid sensor which encompasses all film sizes, and digitally clipping the necessary image following imaging so as to meet the film size which differs for each member.

However, even though such general photography digital diagnostic apparatuses using such photo-electric converting devices (large-area solid sensors) have been developed for the purpose of realizing a film-less diagnosis environment, in many cases, final output to film is required. However, although laser printers having a digital interface are generally used for film output at the present, there are few such printers which can handle all film sizes, and the most common printers can only deal with one, or a few of the following film sizes: 35 cm×43 cm, 35 cm×35 cm, 11"×14", 8"×10", and 10"×12".

Also, the image obtained by diagnosis apparatuses using large-area solid image pick-up devices are digital images, so it is easy to generate images of a desired size, but the output film size is limited, so there is a problem in that the user has to set the valid range for the digital diagnosis apparatus while taking into concern the usable film size for each shot.

On the other hand, in the event of indirect photography with the known photography system using film, the user desires that diagnostic images of the front and side views be simultaneously output onto the film. Regarding such requests, diagnosis apparatuses using large-area solid image pick-up devices are capable of taking a plurality of photographed images into a workstation, synthesizing the images as necessary, and outputting to the printer. However, there is a problem with this arrangement, in that the user must perform final output synthesizing, and thus is troublesome.

Also, in the event that digital image data is obtained using the above-described photo-electric converting devices or CR devices, performing communication of the obtained digital data between radiography apparatuses using a recently-developed standard protocol DICOM for transferring medical-use image information. However, with such arrangements, a great number of image generating apparatuses and image output devices are connected to a single network, so registration of the name and network address of the transfer destination must be regularly performed for each apparatus, making for troublesome work for the user and service personnel and taking excessive time.

SUMMARY OF THE INVENTION

Accordingly, it is an object of the present intention to solve the problems of known photography apparatuses and system such as described above.

It is another object of the present invention to improve operability for the user of an image pick-up system using image pick-up means with a large screen.

With consideration to these objects, an image pick-up apparatus according to an embodiment of the present invention comprises: image pick-up means; detecting means for detecting the state of one or more image output devices connected to the apparatus via a network; and control means for controlling the exposure area defined by the image pick-up means, according the detection output of the detecting means.

Also, an image pick-up apparatus according to another embodiment of the present invention comprises: a sensor for forming image signals from X-ray signals transmitting an object; detecting means for detecting the state of one or more image output devices connected to the apparatus via a network; and display means for displaying the exposure range of the sensor according to the size detected by the detecting means.

It is yet another object of the present invention to provide an image pick-up apparatus and system which is capable of automatically achieving optimal image output without troubling the operator.

With consideration to these objects, an image pick-up apparatus according to yet another embodiment of the present invention comprises: image pick-up means; a plurality of image output devices connected to the apparatus via a network; detecting means for detecting the state of the plurality of image output devices; and setting means for setting the output device for outputting the image signals exposed by the image pick-up means, according the detection output of the detecting means.

Other objects and characteristics of the present invention will be more clearly understood from the following detailed description of the invention.

BRIEF DESCRIPTION OF THE DRAWINGS

FIG. 18 is a diagram illustrating an example of an output destination table stored in the output destination information memory;

FIG. 20 is a diagram illustrating an example of an obtained image table including the contents and output conditions of the obtained image.

DETAILED DESCRIPTION OF THE PREFERRED EMBODIMENTS

Now, detailed description of the present embodiment according to the present invention will be made with reference to the drawings.

Figure 1:
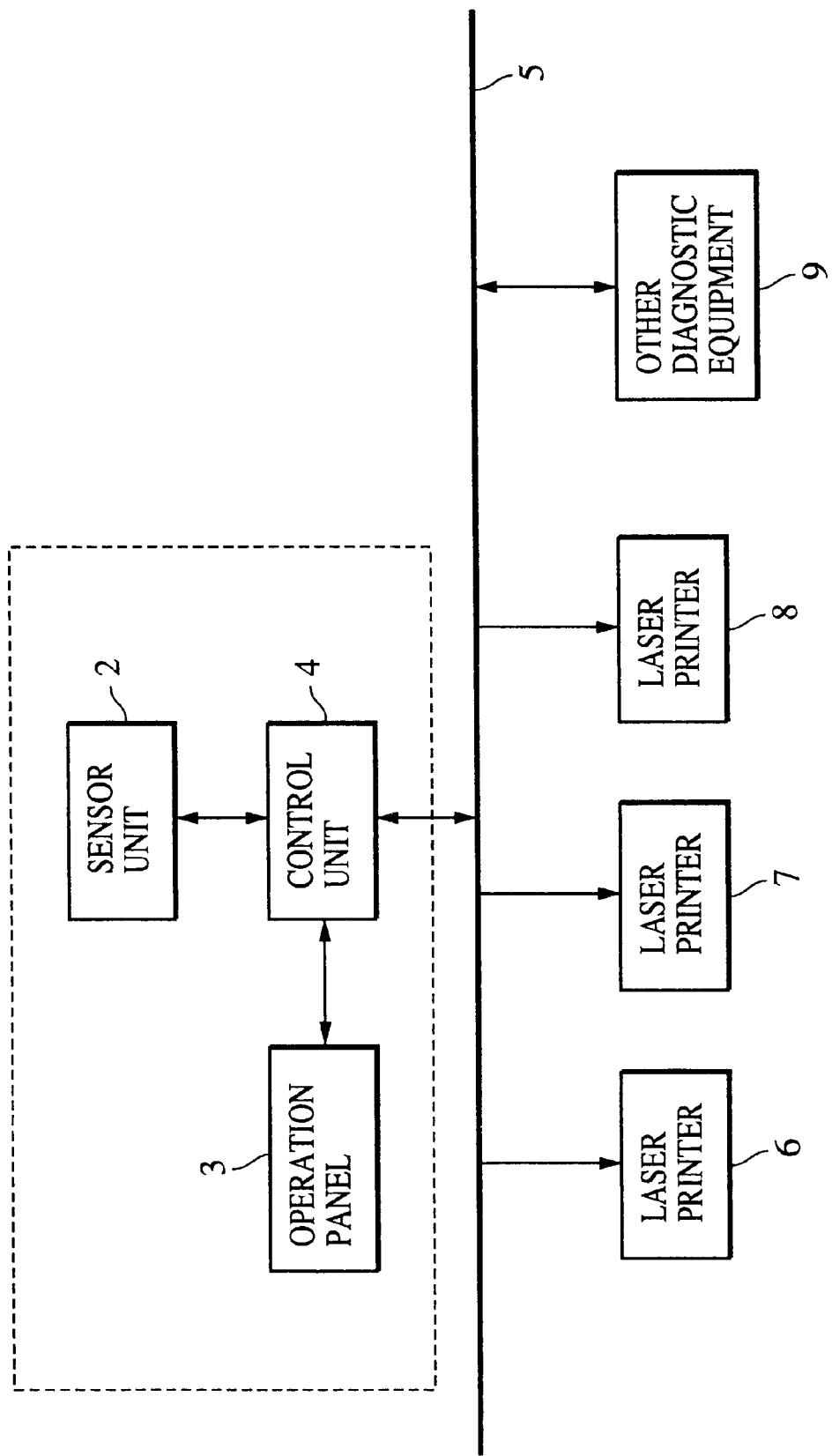
FIG. 1 is a diagram illustrating the overall configuration of a radiography system using a large-screen solid image pick-up device relating to the present invention.

FIG. 1 is a diagram illustrating the overall configuration of a radiography X-ray image pick-up system using a large-screen solid image pick-up device relating to the present invention, wherein the image pick-up apparatus 1 is comprised of a sensor unit 2, an operation panel 3 serving as a user interface and provided with a display, and a control unit 4. Now, the sensor unit 2 and operation panel 3 are connected to the control unit 4 so as to enable interactive communication, and the control unit 4 is connected to a LAN 5 so as to allow for interactive communication. Here, an arrangement conceivable of the LAN 5 is, for example, a LAN like an Ethernet spread throughout a hospital, or the like. A plurality of laser printers 6, 7, and 8, and other diagnostic apparatus 9 such as a CT or the like are connected to this LAN.

Figure 2:
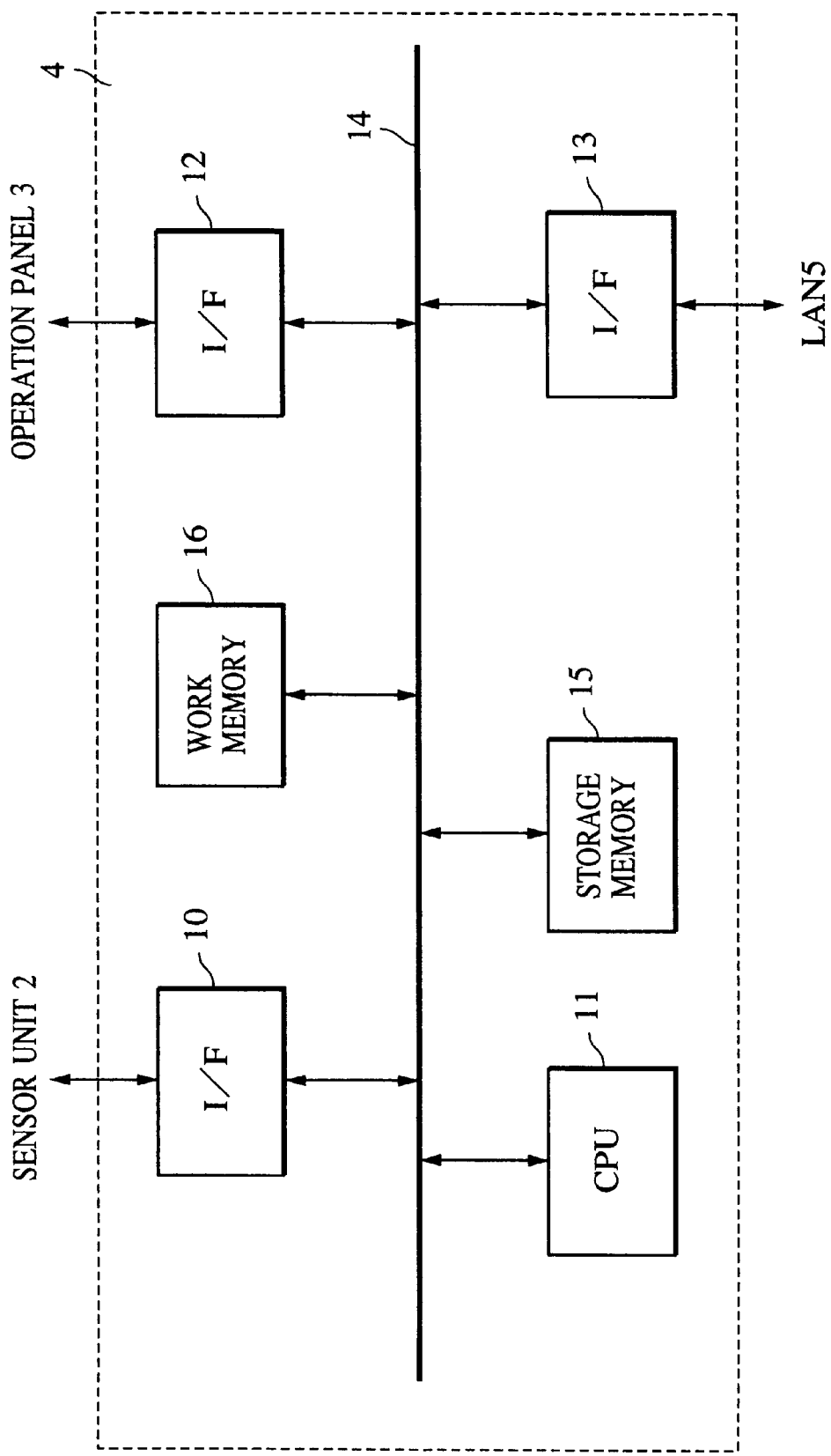
FIG. 2 is a diagram describing the control unit of FIG. 1 in detail.

FIG. 2 is a diagram describing the control unit 4 in detail, wherein the sensor unit 2 detects the X-rays which have passed through the object, and converts the X-rays into electric signals to be output as image signals, but the image signals output from this sensor unit 2 can also be supplied to an internal bus 14 via an interface 10 (I/F). Also, this I/F 10 is an interactive I/F to allow for supplying of control signals from the bus 14 to the sensor unit 2 in order to display the later-described image pick-up portion. 11 denotes a CPU which controls the overall control unit 4, 15 denotes storage memory such as a hard disk, 16 denotes working memory for performing various types of processing, with each of these being configured so as to enable interactive sending and receiving of data with the internal bus 14.

The digital image signals obtained in the sensor unit 2 are temporarily stored in the storage memory 15 via the internal bus 14, and various types of image processing, such as gradation processing, filtering processing, enlarging/reducing processing are performed. The image signals processed thus are output to the LAN 5 via the internal bus 14 and the I/F 13, and can be output from the printers 6, 7, and 8, and so forth.

Figure 3:
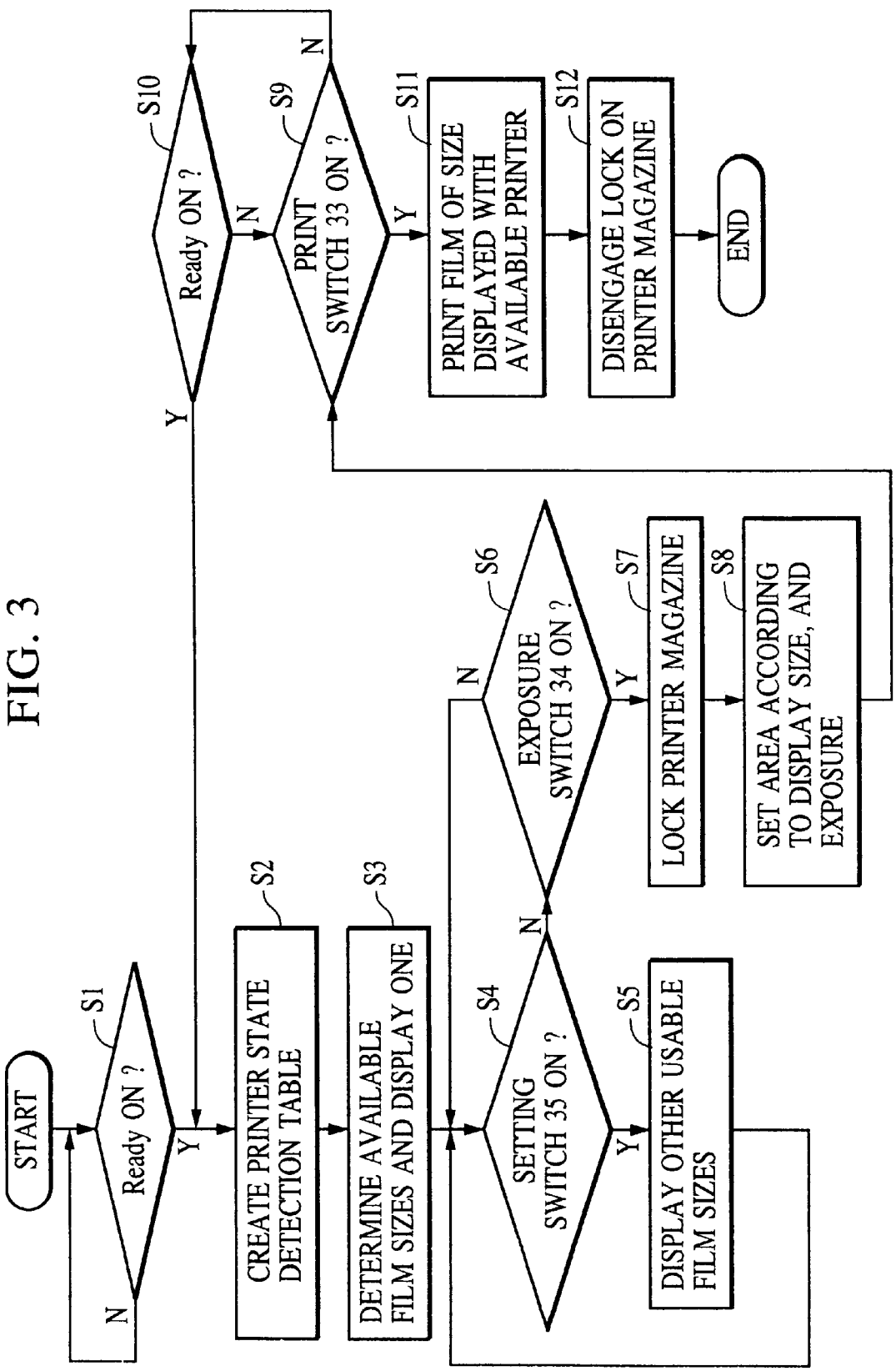
FIG. 3 is a flowchart illustrating an operation example of the system shown in FIG. 1 and FIG. 2.

The following is a description of an example of the operation of the system according to the present embodiment following the flowchart shown in FIG. 3. In the following description, the example given here is an arrangement wherein the specific states and available film sizes of the laser printers 6, 7, and 3 connected to the network of the system shown in FIG. 1 are as follows:

(Printer 6)
   Available film size: 35 cm×43 cm
   Printer state: Only supports this size; is available.
(Printer 7)
   Available film size: 8"×10", 35 cm×35 cm
   Printer state: Supports these two sizes simultaneously; is not available due to maintenance.
(Printer 8)
   Available film size: 8"×10", 10"×12"
   Printer state: Supports either one of these two sizes by exchanging the supply magazine; the 8"×10"magazine alone is loaded, and only this size is available.

Figure 4:
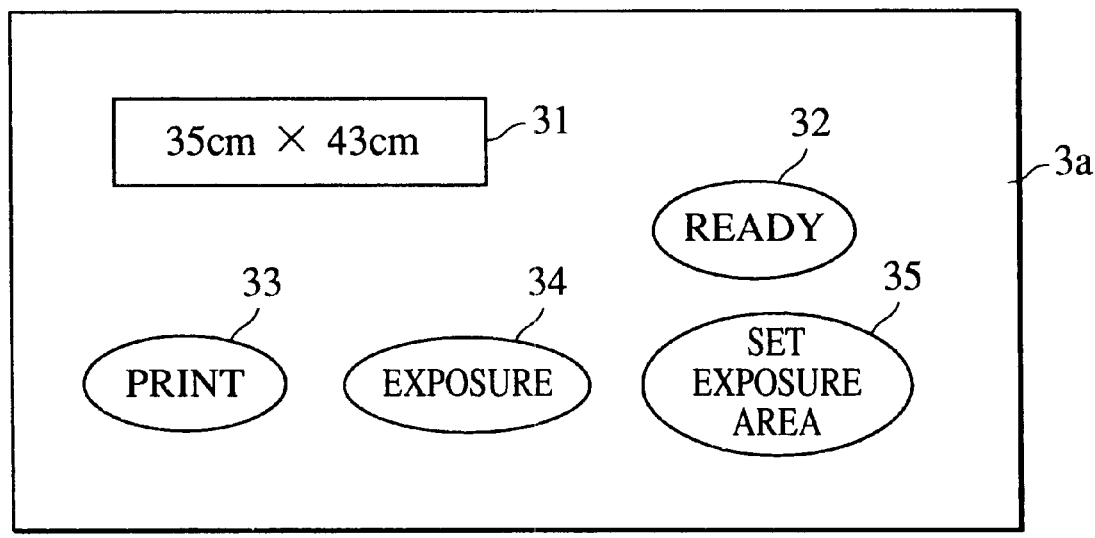
FIG. 4 is an external view illustrating an example of the operating panel shown in FIG. 1.
Figure 5:
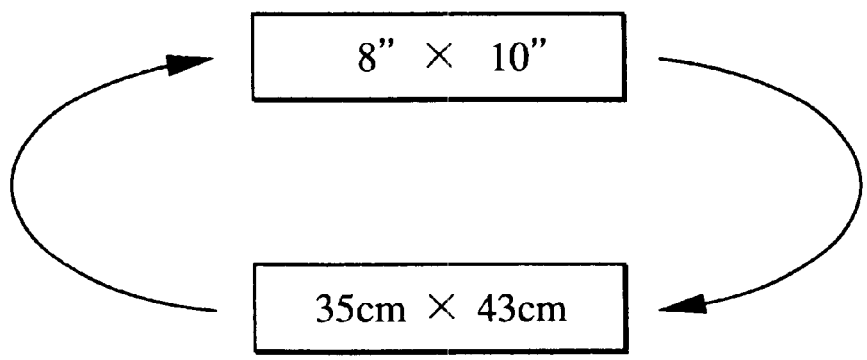
FIG. 5 is a diagram illustrating an example of change of the display shown on the display unit shown in FIG. 4.

FIG. 4 is an external view illustrating the operating panel shown in FIG. 1. In the flowchart in FIG. 3, once the operator presses the READY switch 32 (S1), the operating information of this operating panel is provided to the CPU 11 via the I/F 12 and the internal bus 14, and the CPU 11 puts the image pick-up apparatus 1 in a standby state via the I/F 10. Also, the CPU 11 checks the state of each of the printers via the I/F 13 and LAN 5, in order to comprehend the current state of the printers connected to the system network and the available film sizes, and stores the table obtained by the checking in the work memory 16. i.e., following the above example, a table such as described below would be created within the work memory 16.

(Printer 6)
   Available film size: 35 cm×43 cm
   Printer state: Ready
(Printer 7)
   Available film size: None
   Printer state: Not ready.
(Printer 8)
   Available film size: 8"×10"
   Printer state: Ready Next, an image pick-up area corresponding to the portion to be taken is to be set to the sensor unit 2 according to the table obtained thus, so first, in the present embodiment, one of the available film sizes (e.g., 8"×10") is displayed at the display unit 31 of the operation panel shown in FIG. 4 (S3). In the event that the exposure switch 34 shown in FIG. 4 is turned on in the state (S6), the CPU within the control unit 4 controls the sensor unit 2 and causes exposure to be performed within the exposure area corresponding with the displayed size. In the following, the operation of setting the exposure area by means of the user operating the exposure area setting switch shown in FIG. 4.

In S4 shown in FIG. 3, once the setting switch 35 is turned on, the CPU 11 makes reference to the table stored within the work memory 15, and displays a different available film size (in the above example, 35 cm×43 cm) (S5). Then, each time the operation of turning this setting switch in is repeated, a different available film size is sequentially shown. For example, in the above example, a display for 8"×10" and a display for 35 cm×43 cm are alternately displayed on the display unit 31.

In other words, in the above example, only the two sizes 8"×10" and 35 cm×43 cm are available, so the two sizes are alternately displayed on the display unit 31. The CPU 11 identifies the film size displayed as the film size to be used, and when the exposure switch 34 is then turned on, the magazine holding the film of the selected size is locked (S7), and the exposure area according to this size is set to the sensor unit 2, and the exposure operation in this exposure area is executed (S8). More specifically, at the sensor unit 2, a exposure area is set corresponding to (equal to) the displayed film size, based on commands from the CPU 11 of the control unit 4.

Once exposure is completed, the apparatus is in a print standby state, but in the event that the exposed image at this time is not that which was desired, turning the READY switch 32 on again (S10) enables re-executing the photography routine from the point of detecting the state of the printer.

In this print standby state, turning the print switch 33 shown in FIG. 4 printout of the image signals stored in the storage memory 15 is performed (S11) by the available printer of which the film size is displayed. In the above case, this would be the printer 6 in the event that the displayed size is 35 cm×43 cm. Subsequently, the previously locked printer magazine is released (S12), and the process is completed.

Figure 6:
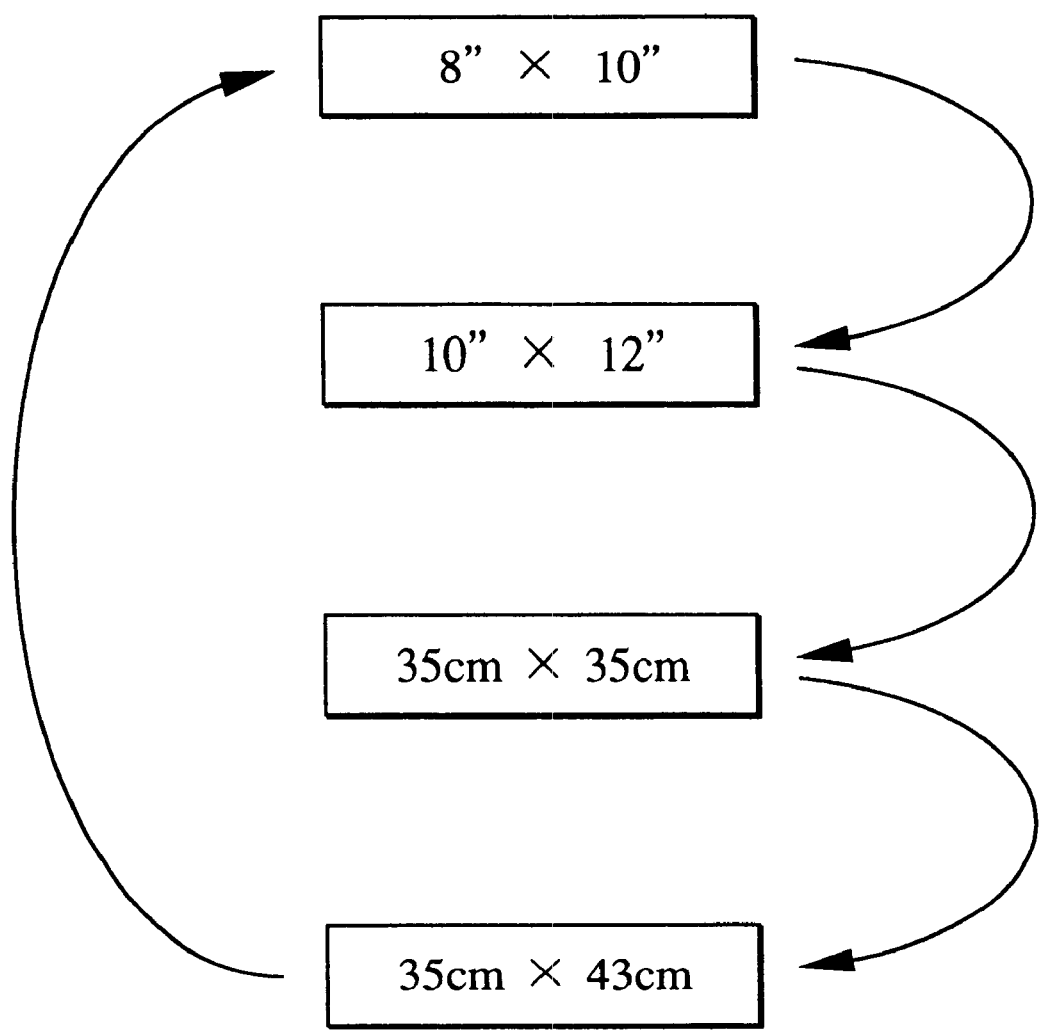
FIG. 6 is a diagram illustrating another example of change of the display on the display unit shown in FIG. 4.

Next, an example will be described wherein the available film sizes of the laser printers 6, 7, and 8 are as described below, as another specific example for describing the operation of the present embodiment:

(Printer 6)
   Available film size: 35 cm×43 cm
   Printer state: Ready
(Printer 7)
   Available film size: 8"×10 , 35 cm×35 cm
   Printer state: Ready
(Printer 8)
   Available film size: 10"×12"
   Printer state: Ready In other words, in this specific example, as compared to the above example, the printer 6 is still in the Ready state, the printer 7 has completed maintenance and is in the Ready state, and the magazine of the printer 8 has been exchanged and is in the state wherein 10"×12" film is available. In this case, as shown in FIG. 6, each time the operator turns the exposure area setting switch 35 on in S4 of FIG. 3, a different available film size of the four film sizes is sequentially shown on the display unit 31, and the exposure area on the sensor unit 2 is set according to this displayed size in S8.

Thus, information of the printers and the available film sizes on the network is collected while in the exposure standby state, and the exposure area on the sensor unit 2 is restricted to a printable size, so the operator does not need to check out the printer state and availability, and exposure at the same size as the final is facilitated. Also, in the event that the exposed portion is to large for the output film sizes, the operator can identify such and change the magazine of a printer having exchangeable magazines so that the desired size is available, and thus perform exposure at the desired size. With such a system, the load on the operator is minimal, there is no unnecessary extracting processing nor various types of image processing in order to obtain the desired image, and hence is greatly effective in increasing processing speed.

Also, according to the system of the above embodiment, in order to avoid mistaken printing due to human error of mounting a magazine of an incorrect size to the printer, a configuration is employed wherein the magazine to be used is locked from the time that the exposure area has been determined to the time that the actual printing is completed. Thus, a system which has a higher degree of fool-proofing is configured.

Figure 7:
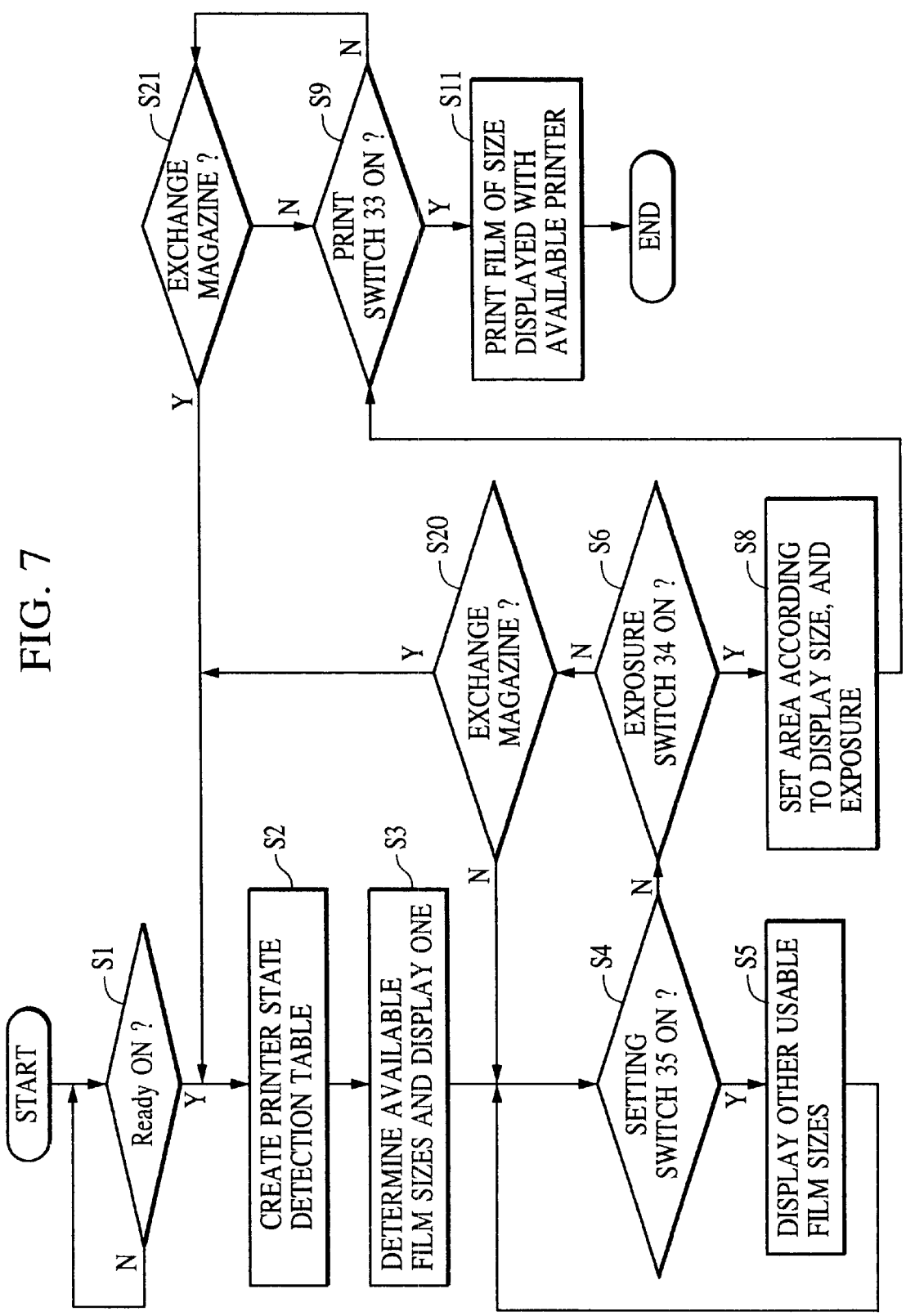
FIG. 7 is a flowchart illustrating another example of operation of the system shown in FIG. 1 and FIG. 2.

FIG. 7 is a flowchart illustrating another operational example of the system shown in FIG. 1, wherein a magazine lock mechanism is not provided to the printer. In this case, in the event that there is replacement of magazines (S20, S21) in the exposure standby state or the print standby state, the printer state is detected once more, and the exposing and printing operations are repeated. Such a configuration also allows the above operator problems to be solved.

Also, another arrangement might be issuing a warning or notification at the timing of locking the magazine in S7 of the flowchart in FIG. 3, such as displaying a caution text "printing image reserved" on the display device provided near the printer, or lighting a pilot light to indicate that the part of concern is presently being used.

Figure 8:
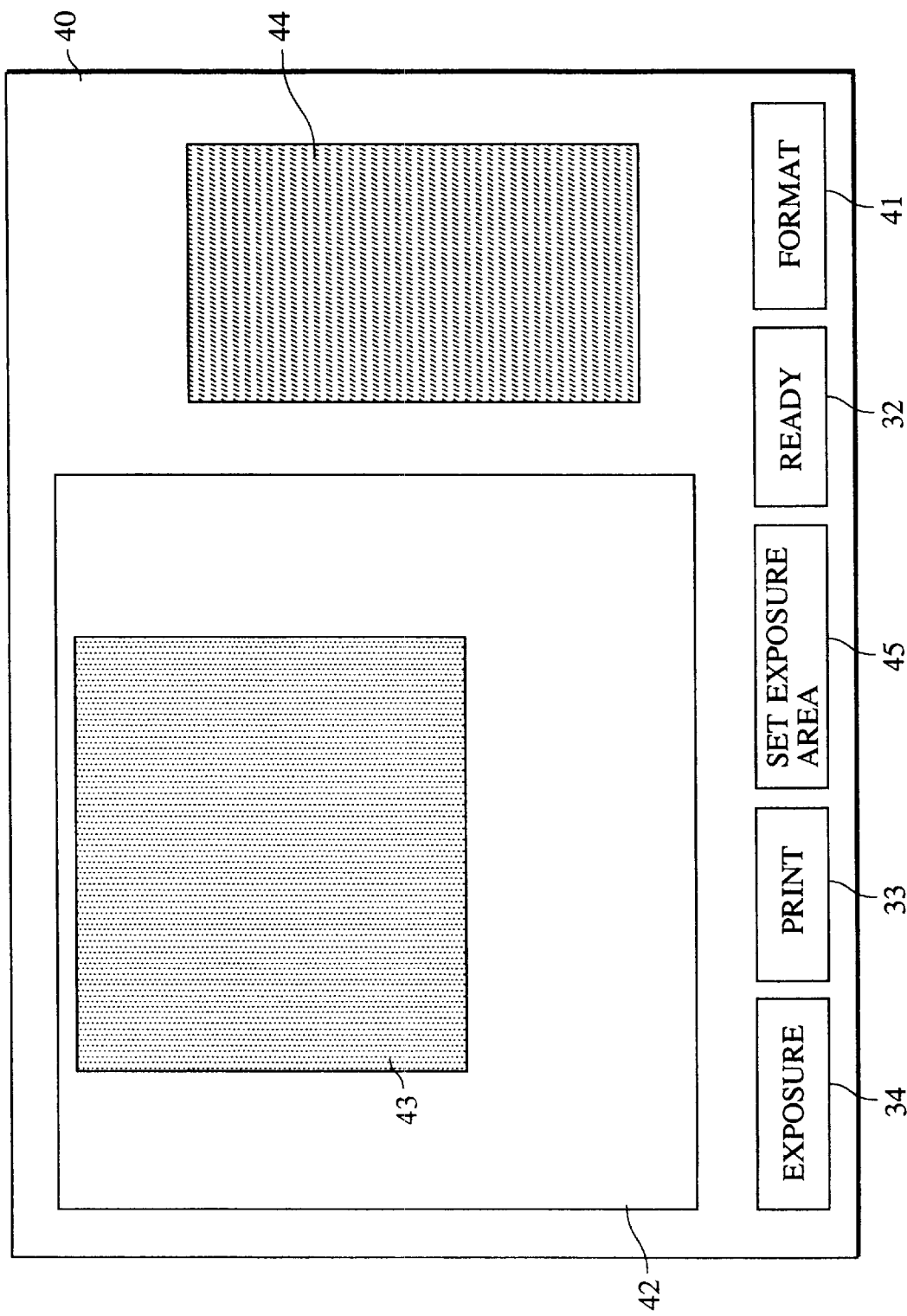
FIG. 8 is an external diagram illustrating another example of the operating panel shown in FIG. 1.

Next, in the system indicated in FIG. 1 and FIG. 2, and embodiment will be described wherein printing is enabled in various formats. FIG. 8 is a figure illustrating an example of the operating panel 3 corresponding to this embodiment, wherein the entire operating panel shown in the figure is a liquid crystal display screen 40, upon which the various operations can be carried out by means of a touch panel or by clicking a mouse. Such integrated user interfaces comprised of a touch panel and liquid crystal device are widely used, so there should be no need to make detailed description of the specific data processing or touch panel detection methods thereof.

A frame 42 indicating the valid area of the entire large-screen sensor unit 2 is displayed on the liquid crystal display screen 40 of the operation panel, and in the event that image signals are obtained from the entirety thereof, the exposed image is displayed within this frame. In FIG. 8, the parts with functions equivalent to those of the panel shown in FIG. 4 are denoted by the same reference numerals although the structures thereof are different, and detailed description thereof is omitted. In the present embodiment, the exposure area setting switch 45 for commanding starting of the operation for setting the film size, and the format switch 41 for setting the printing format of the image have different functions as to the above embodiment. Also, the area 43 is a portion which displays an area corresponding to the actually exposed area, and area 44 is a display portion used for setting the area or setting the format, the details thereof being described later.

Figure 9:
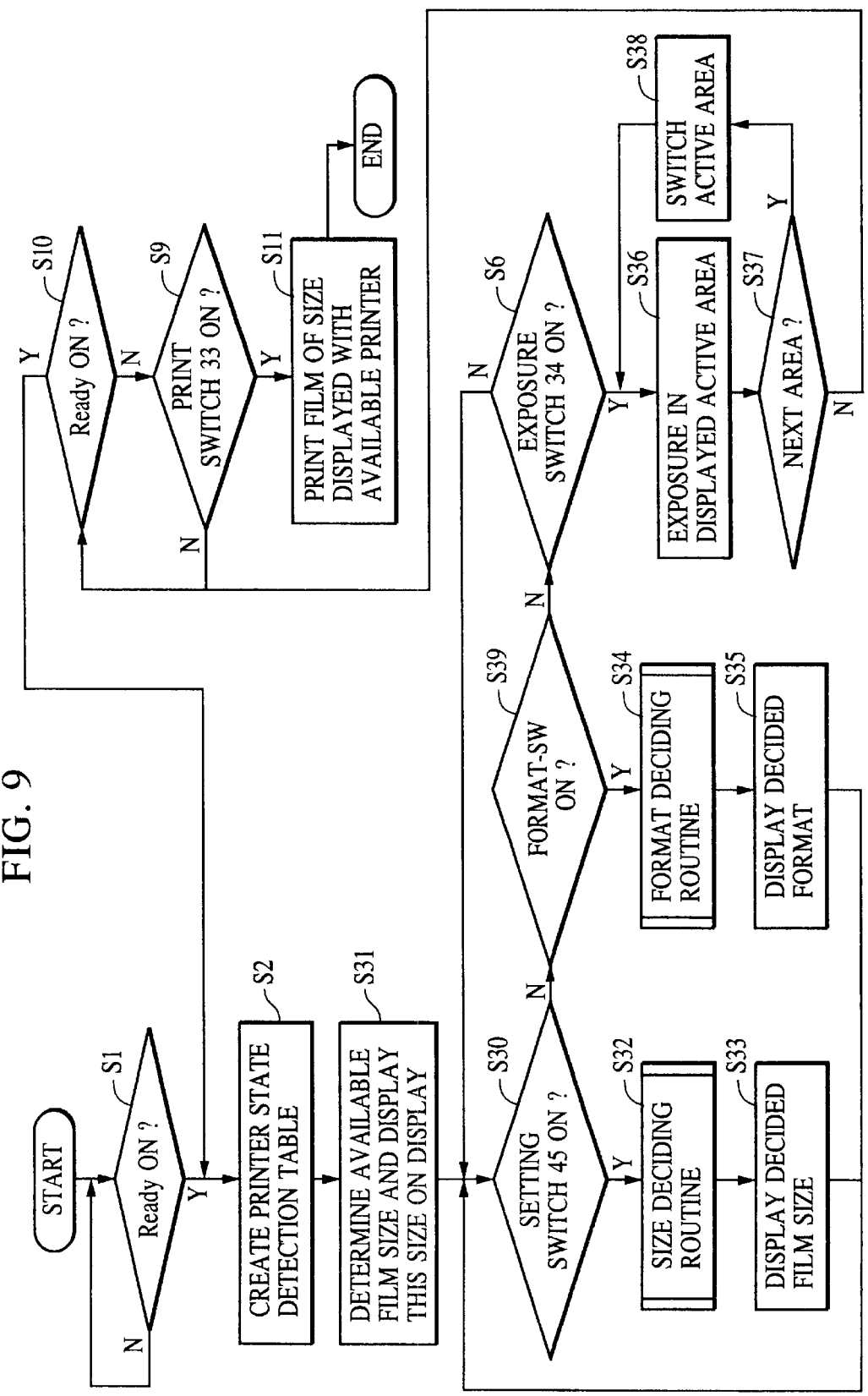
FIG. 9 is a flowchart illustrating an example of operation of the system shown in FIG. 1 and FIG. 2 in the event that the operating panel shown in FIG. 8 is used.

FIG. 9 is a flowchart for describing the operation of a system under the control of the controller 4 and CPU 11, wherein the steps with functions equivalent to those of the flowchart shown in FIG. 4 are denoted by the same reference numerals, and detailed description thereof is omitted. As with the above embodiment, turning the Ready switch 32 on sets the standby state, upon which one of the available film sizes is automatically selected, and a frame 43 corresponding to the exposure area corresponding to this film size is displayed (S31). With the present embodiment, in this step, a display is performed in order to notify the exposure area to the sensor side, as well.

Figure 10:
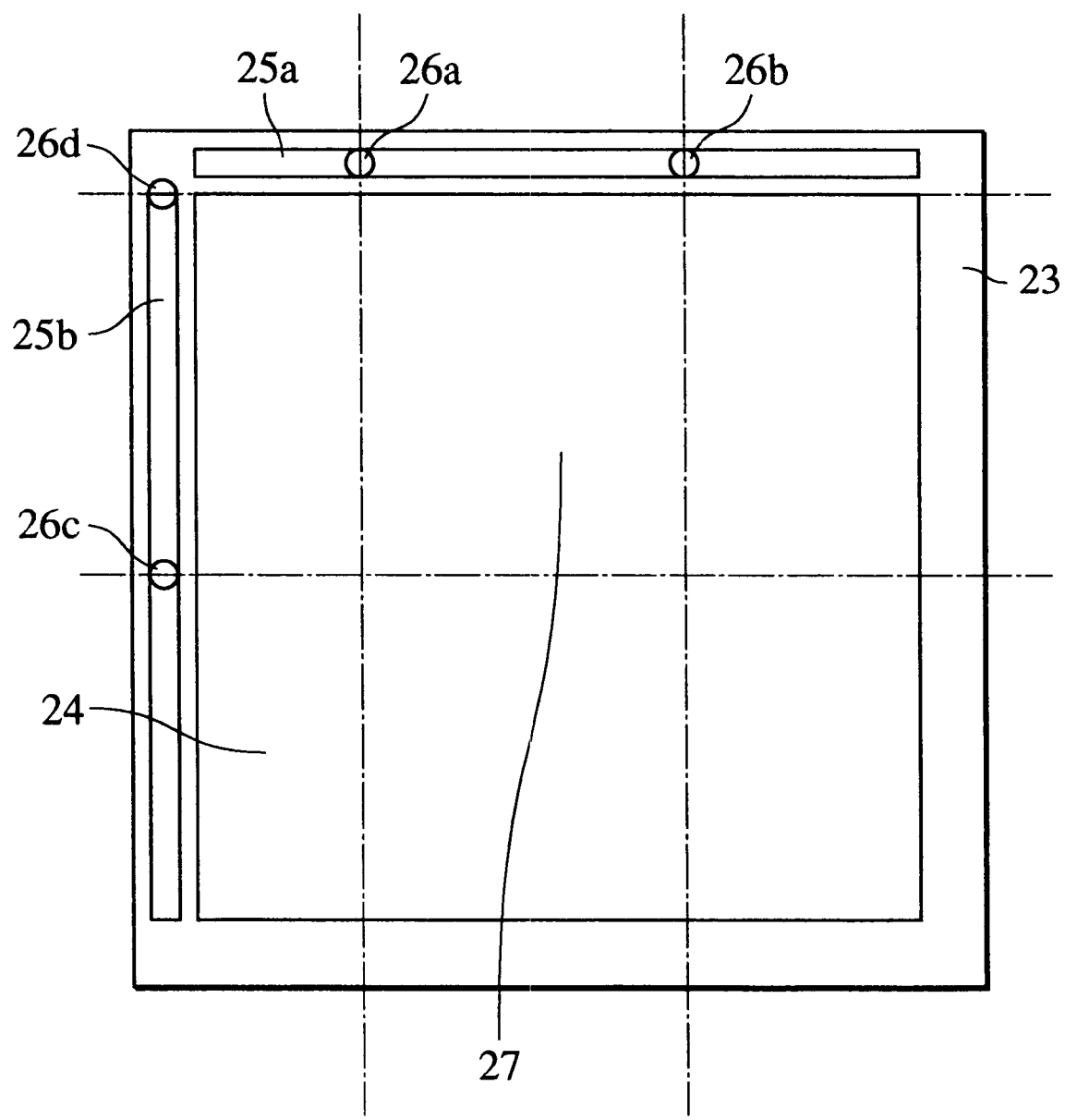
FIG. 10 is a diagram illustrating an example of configuration of the photography area display means provided to the sensor unit shown in FIG. 1.

FIG. 10 is a diagram illustrating an example of configuration of the exposure area display means provided to the sensor unit 2, in which 23 denotes an frame cover provided to the sensor unit 2, 24 denotes a valid area corresponding to the entire exposure area of the sensor unit 2, of which the size is such corresponding to the maximum size of the available film, and is set to 43 cm×43 cm. An LED 25a array is provided to the upper side of this valid area 24 in order to perform area display in the horizontal direction, and an LED array 25b is provided to the left side thereof in order to perform area display in the vertical direction.

The LED arrays 25a and 25b are comprised of, for example, 256 LED devices linearly arrayed at 1.68 mm spacing which is sufficient for display precision, and notifies the valid exposure area 27 to the operator by changing the lit position of the LED devices according to the set film size, i.e., the exposure area. In other words, the LEDs 25a and 25b indicating the valid exposure area 27 on the sensor unit 2 are lit. FIG. 10, illustrates the state wherein the LED devices 26a and 26b, and the LED devices 26c and 26d are respectively lit, indicating an area 27 as the currently valued area, surrounded by two vertical lines passing through the LED devices 26a and 26b and the two horizontal lines passing through the LED devices 26c and 26d.

Returning to FIG. 9, in the above step S31, one of the plurality of available film sizes is displayed as shown in FIG. 10. At the point that the display is made on the display screen 40 and the sensor frame cover 23 in this step S31, the system is in a exposure standby state. In the present embodiment, setting of the print format and exposure state can be performed in this exposure standby state in addition to exposing operation, and turning the exposure area setting switch 45 (S30) brings up the size deterring sub-routine (S32).

Figure 11:
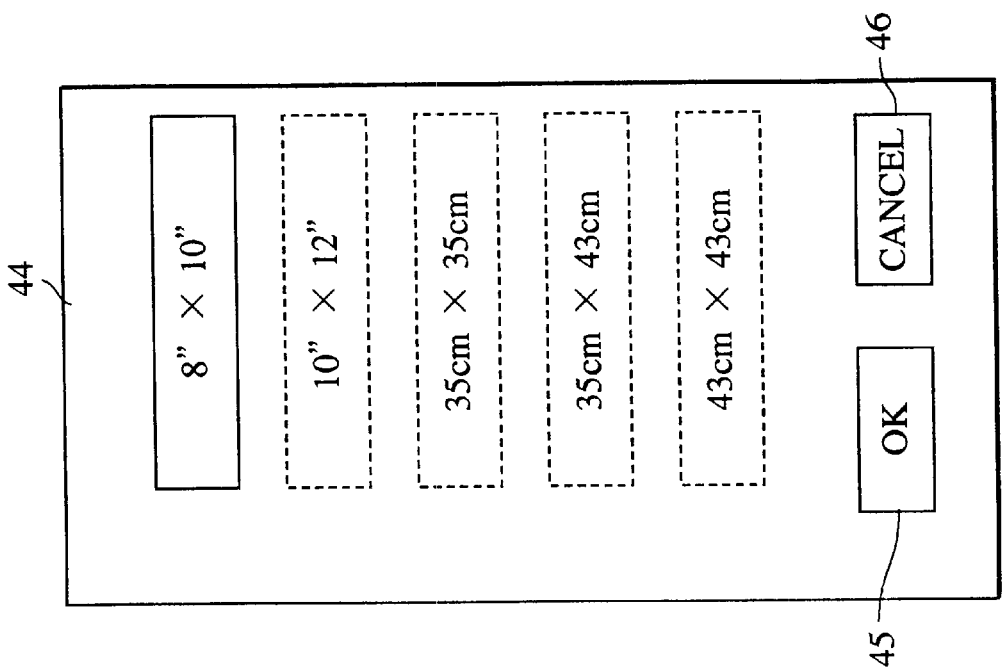
FIG. 11 is a diagram for describing the size determining sub-routine.

FIG. 11 is a diagram for describing the size determining sub-routine, illustrating the display on the area 44 on the display screen 40 shown in FIG. 8. In the Figure, all currently available film sizes are shown in the area 44, of which one is in the active state. In the Figure, 8"×10" is the presently selected display size, with the other sizes being film sizes which are available but not selected. Now, in the event that the operator turns one of the displayed sizes on or clicks this size, and then further turns the OK switch 45 on, the size which is turned on is newly set as the film size (exposure size). Turning the cancel switch 46 on at this point causes the processing by this sub-routine to be ignored.

The size determined by the above size deterring sub-routine is displayed on the display screen 40 and on the frame cover 23 of the sensor in the same manner as with S31 (S33), and the system enters a photography standby state in that size.

Figure 12:
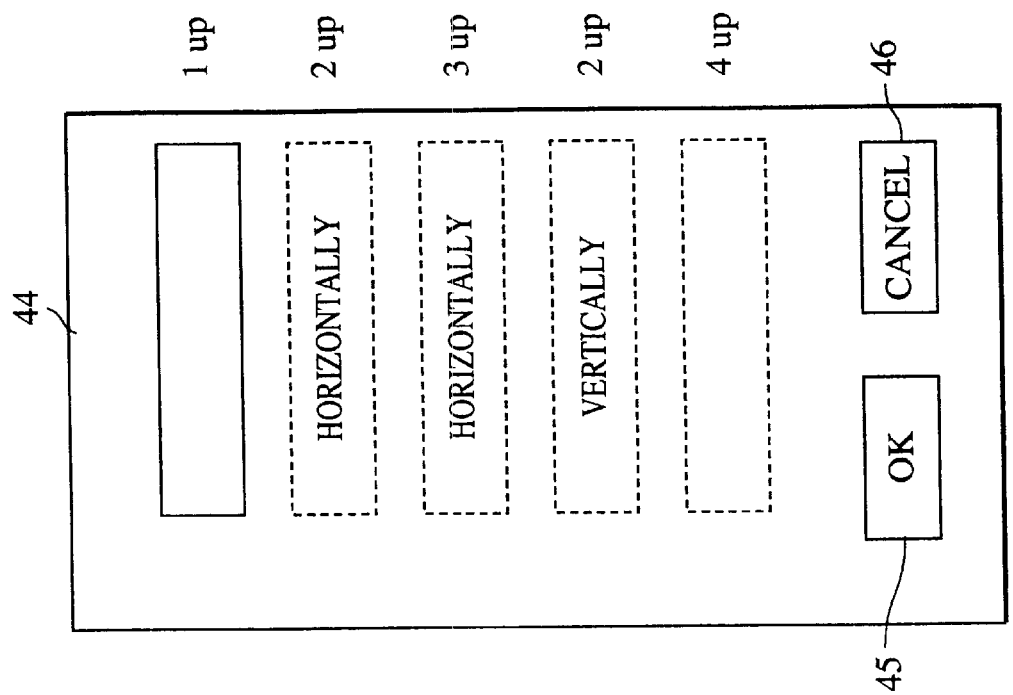
FIG. 12 is a diagram for describing the format determining sub-routine.

In the exposure standby state, turning the format switch 41 on (S39) brings up the format determining sub-routine (S34). FIG. 12 is a diagram for describing this format determining sub-routine, illustrating the display on the area 44 on the display screen in the same as with FIG. 8. As shown in the Figure, all available print formats are shown on the area 44, and one of these is in the active state. FIG. 11 indicates that 1 up standard exposure is the currently selected format, and while there are other formats available, these are not selected. Now, in the event that the operator turns one of the displayed formats on or clicks this format, and then further turns the OK switch 45 on, the format which is turned on is newly set as the printing format. Turning the cancel switch 46 on at this point causes the processing by this sub-routine to be ignored.

Figure 13:
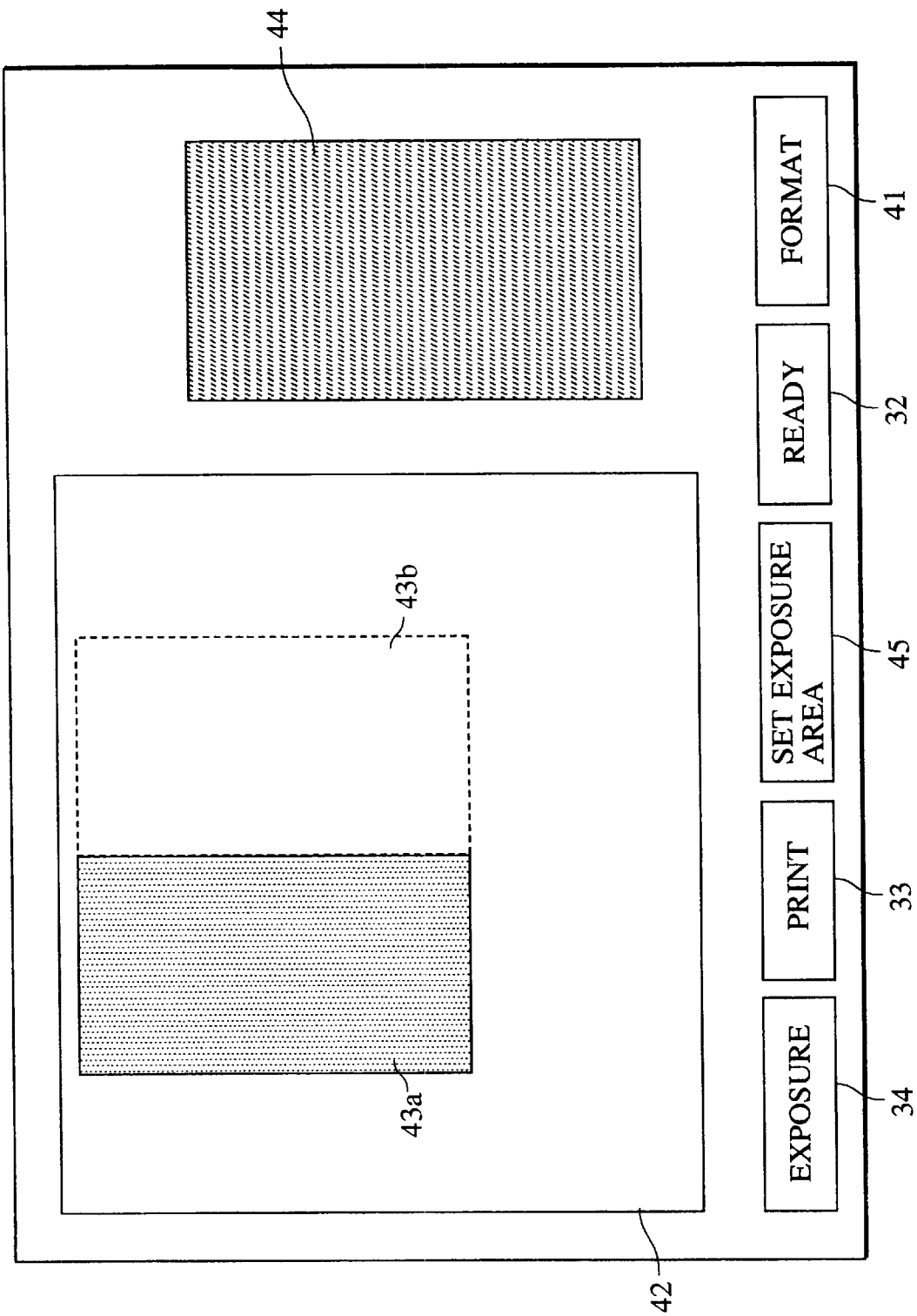
FIG. 13 is a diagram illustrating another example of display by the display means shown in FIG. 10.

Thus, at the point that the format is set, the display screen 40 performs display following the set format. FIG. 13 illustrates the format "2 up horizontally". With the format "2 up horizontally", the exposed images are stored in the storage memory 15 so as to print a synthesized image with the image obtained by the first exposure positioned on the left, and the image obtained by the second exposure positioned on the right. In likewise manner, "3 up horizontally" prints a synthesized image with the three images positioned on the left, center, and right, "2 up vertically" prints a synthesized image with the two images positioned on the top and bottom, and "4 up" prints a synthesized image with the four images positioned on the upper left, upper right, lower left, and lower right.

On the other hand, in the event of printing an image comprised of a plurality of images synthesized thus, The exposure position of each of the synthesized images on the sensor 2 is not changed, so the display on the frame cover of the sensor 2 in dictates that an area which is a fraction of the standard "1 up" format area is the exposure area. In other words, while the LED devices 25a and 25b are shown such as illustrated in FIG. 10 in the event that the film size is 8"×10", in the "2 up horizontally" format, the spacing between the LED devices 26a and 26b is lit as being ½. Also, even in the event that a plurality of exposures are taken, this display position is not changed.

In the exposure standby state, turning the expose switch 34 on in the "1 up" format performs exposure in the area of the sensor 2 corresponding to the active area 43 in FIG. 8, for example. On the other hand, in the case of "2 up horizontally", one of the two split film sizes 43a and 43b is the active area, as shown in FIG. 13, and exposure corresponding to this area 43a is performed (S36). At this time, the LED devices 24a and 25b provided to the outer cover 23 of the sensor as described above also are lit to indicate the exposure area.

Then, since continuous radiography of a plurality of images is performed for split formats of two or more, confirmation is made (S37) of whether or not there is an area to be exposed next, and in the event that an area to be exposed next exists, the active area shown on the display screen 40 is switched (S38). For example, in the "2 up horizontally" format, in the event that exposure in the area corresponding with area 43a in FIG. 13 has been completed, the area 43b is made to be the active area and the flow returns to step S36, thereby executing exposure in the area. Also, at the time of executing exposure, the exposed image signals are transferred to the storage memory 15, and the image corresponding to the image area is stored at an address determined by the format. Also, the lighting position of the LED devices 25a and 25b do not change even for exposing the next area.

Accordingly, the image synthesized in the storage memory is printed out on an available film size which has been set, in the steps S9 and S11 in FIG. 10.

According to the above embodiment, in addition to the earlier embodiment, not only can a plurality of images be synthesized and formatted for printout, but also troublesome operations can be efficiently carried out on a display screen, setting of the exposure portions is automatically optimally set, thereby exhibiting marked effects such as lightening of the operating load, increased processing speed, and so forth.

Figure 14:
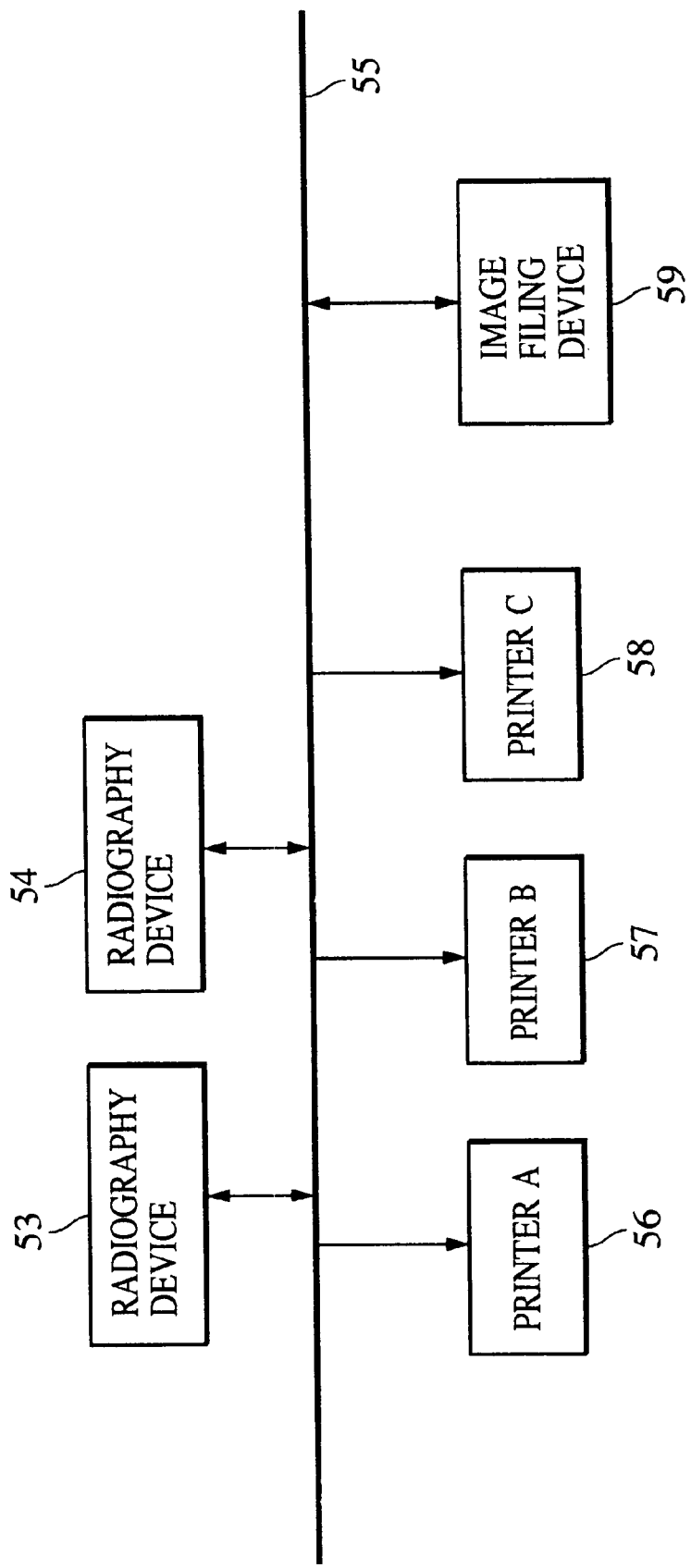
FIG. 14 is a block diagram illustrating the overall configuration of a radiography system according to another embodiment of the present invention.

Next, description will be made regarding another embodiment according to the present invention. FIG. 14 is a block diagram illustrating the overall configuration of a radiography system according to another embodiment of the present invention. In the Figures, 53 and 54 are both image pick-up apparatuses, the detailed structure thereof being illustrated in FIG. 15.

The system according to the present embodiment is configured of two image pick-up apparatuses 53 and 54 and three types of printers (A, B, C) 56, 57, and 58 connected to a LAN 55. Further connected to the LAN 55 is an image file device 59, enabling images obtained by the image pick-up apparatuses to be stored in the image file device 59, or to be printed out by the printers (A, B, C) 56, 57, and 58. Also, images stored in the image file device 59 can be printed by the printers in the same manner.

The image pick-up apparatuses 53 and 54 take the output signals of a two-dimensional sensor 60 which performs photo-electric conversion of a transmitted X-ray image, and temporarily stores the output signals in image memory 61 as image signals. Now, the image signals stored in the present embodiment are obtained as 2700×2700 pixel, 12-bit, 160 μm/pixel pitch image data. Then, this image data obtained for output to the film for diagnosis and the information regarding desired printing conditions input by the operator via the operation panel 65 are output to the LAN 55 via the interface 66, and thus disclosed. Also, reference numeral 62 in FIG. 15 denotes memory for storing printer information of the printers connected to the LAN 55, this information being obtained via the I/F 66. This information will be described later.

Figure 15:
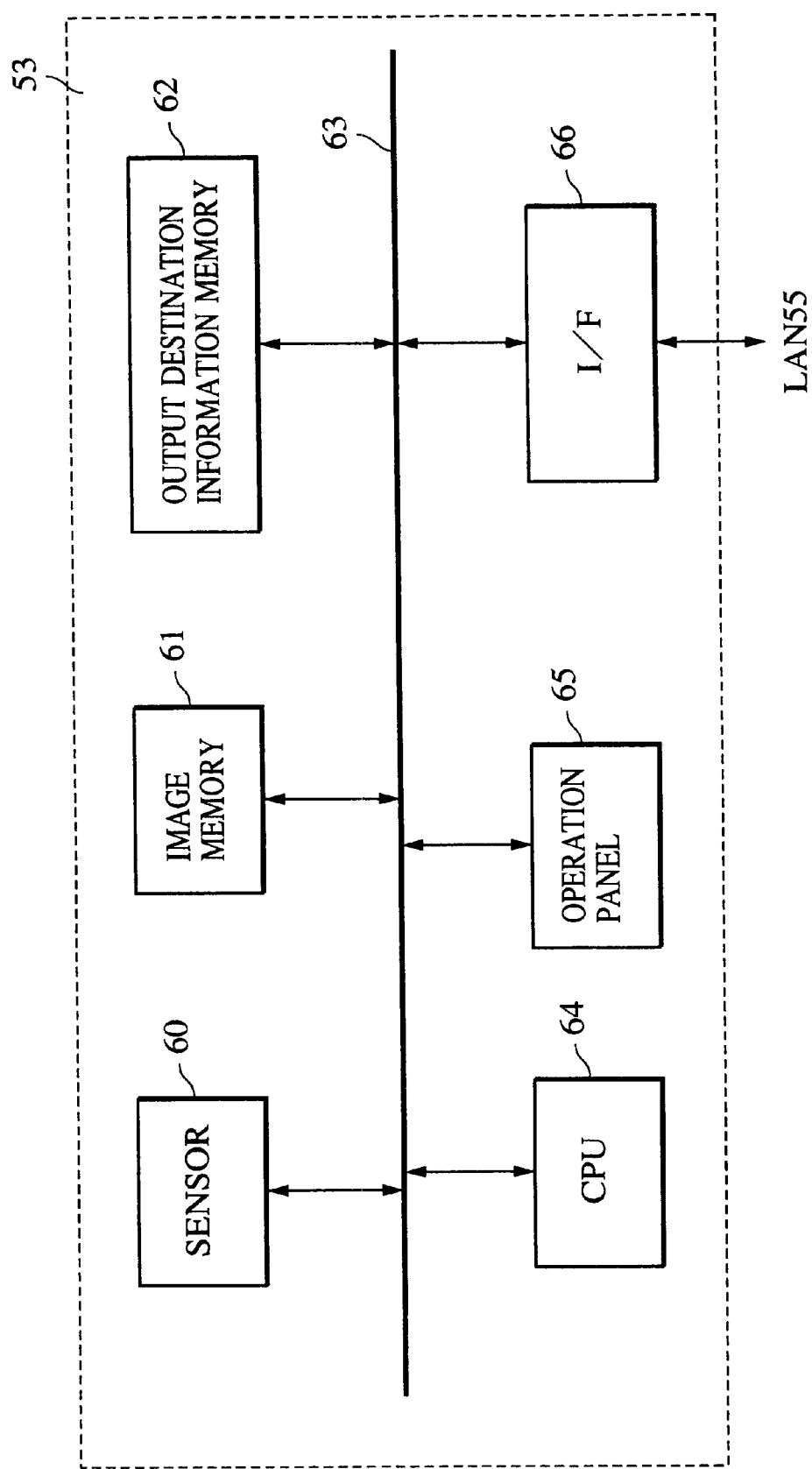
FIG. 15 is a block diagram illustrating the details of the image pick-up apparatus shown in FIG. 14.
Figure 16:
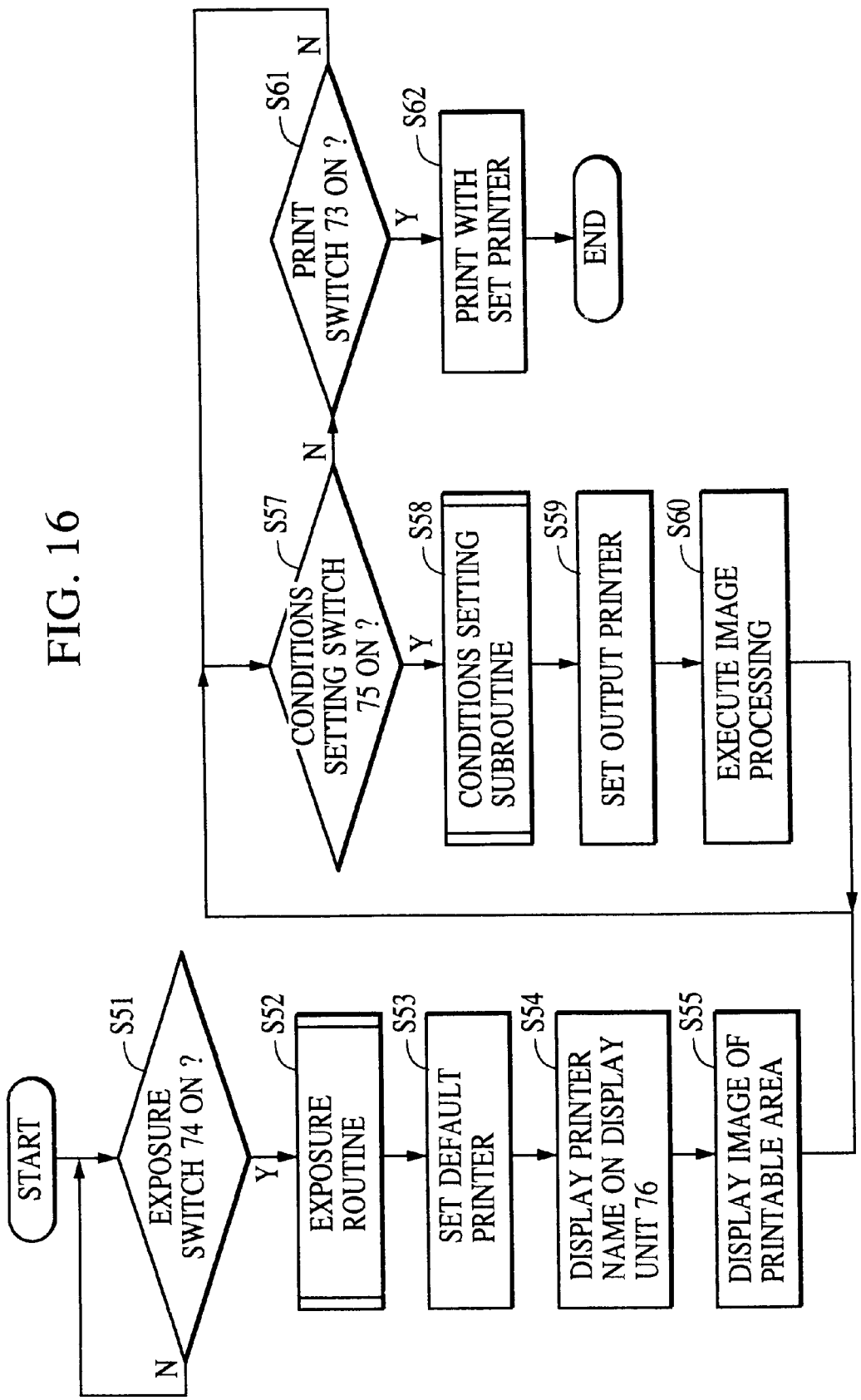
FIG. 16 is a flowchart illustrating an example of operation of the system shown in FIG. 14 and FIG. 15.
Figure 17:
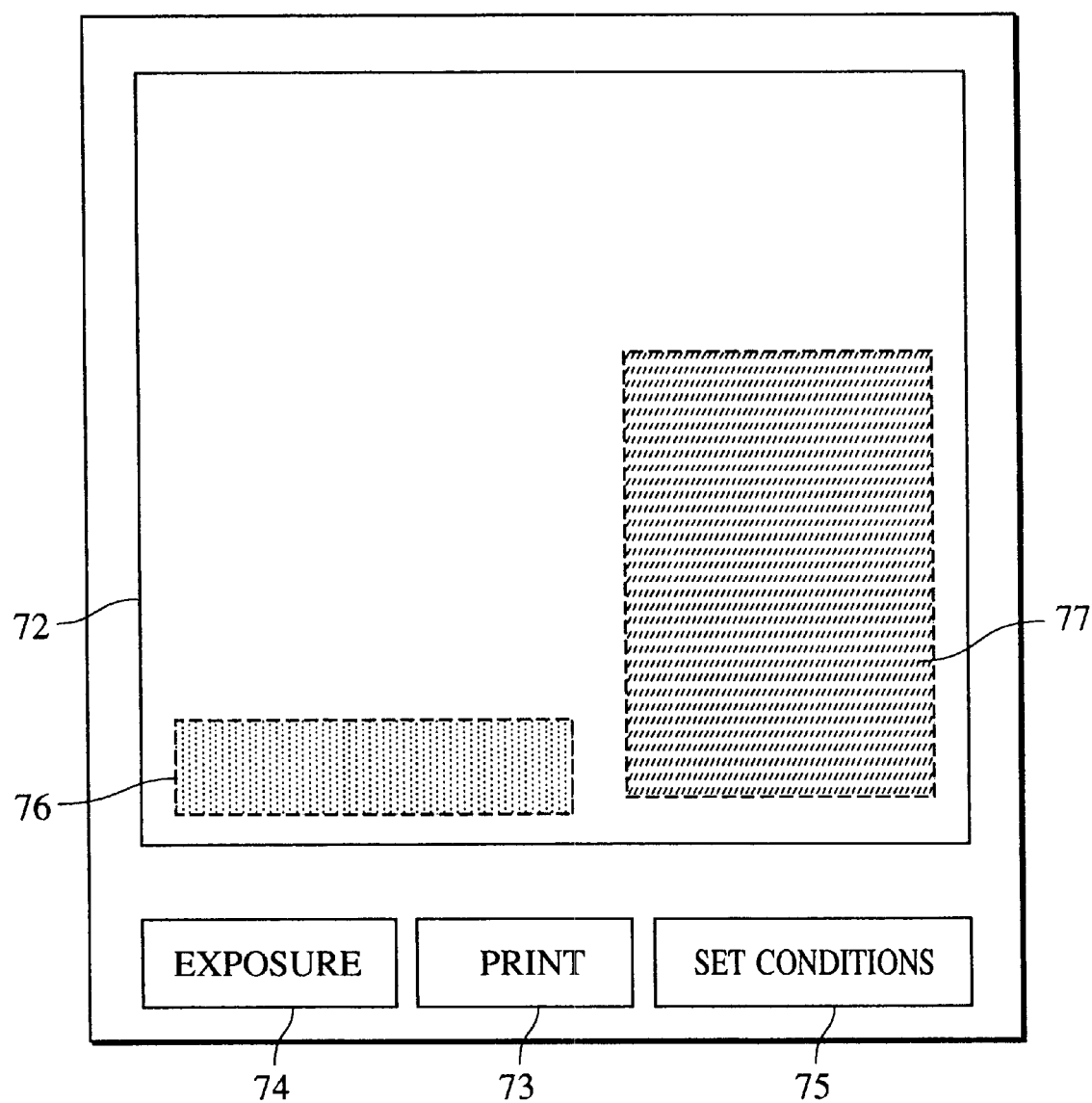
FIG. 17 is a diagram illustrating an example of configuration of the operating panel shown in FIG. 15.

FIG. 16 is a flowchart illustrating an example of operation of the system shown in FIG. 14 and FIG. 15, and FIG. 17 is a diagram illustrating an example of configuration of the operation panel shown in FIG. 15. Description will now be made of the operation of the present embodiment with reference to FIG. 16 and FIG. 17. In FIG. 18, 72 denotes an image display unit upon which an obtained image is displayed, 76 denotes ea display unit displaying the printer name of the printer from which output of the image is being attempted, 77 denotes a display unit displaying the setting screen for setting the output conditions, with each of the displays being displayed with the obtained image on the image. Also, 73 denotes a printing switch, 74 denotes a expose switch, and 75 denotes conditions setting switch, and the apparatus is controlled as described later by means of the operator operating any of the switches.

In the flowchart shown in FIG. 16, turning the photography switch 74 on (S51) brings up the exposure sub-routing (S52), the sensor 60 shown in FIG. 15 outputs electrical signals indicating the X-ray image, and the output image signals are temporarily stored in the image memory as image data, as with the above-described example. Now, in the case that image data has been obtained for printing by the other image pick-up apparatus as well, that image data is also stored in the image memory 61 in the same manner.

Now, one of the printers is automatically determined as the printer to print out the exposed image signals (S53). This determination is made by a method wherein a printer is registered as a "printer generally used", or some like method. This printer name is displayed on the display unit 76 of the operation panel 65 shown in FIG. 17 (S54), and the image to be printed also is displayed on the image display unit 72 (S55). At this time, the only portion displayed is the portion of the image which will actually be printed out when the printing switch 73 is turned on. Now, the area which can be printed by the printer is determined by making reference to the printer output range which is registered as the default printer, a process of clipping a portion of the obtained image according to this data is performed by the CPU 64 and is transmitted to the operation panel 65, and thus a state of print standby is achieved.

In this print standby state, turning the conditions setting switch 75 on (S75) brings up the conditions setting sub-routine (S58), and within this routine, the state of the currently operable printers is confirmed. This confirmation work is performed by obtaining via the I/F 66 the information disclosed by each of the printers via the LAN 55, and the information thereof is stored in the output destination information memory 62 in the form of an output destination information table. In the event that two of the three printers (A, B, C) 56, 57, and 58 are operable, the table is compiled such as shown in FIG. 18, for example.

Figure 19:
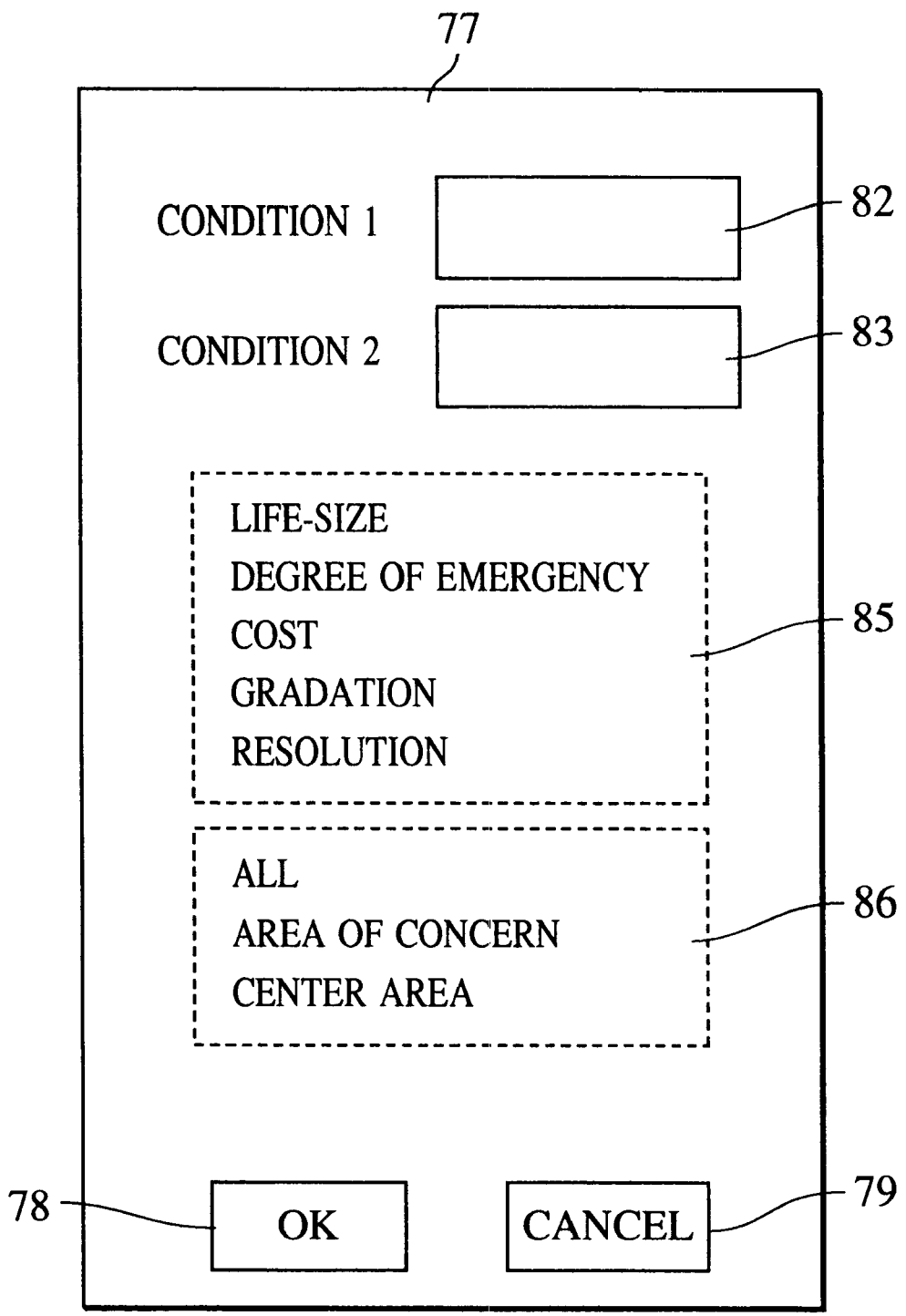
FIG. 19 is a diagram illustrating an example of the conditions setting screen displayed on the display unit shown in FIG. 17.

Next, in this sub-routine, a conditions setting screen such as shown in FIG. 19 is displayed on the display unit 77 shown in FIG. 17. Now, the user selects two conditions. One is regarding the priority of output of the image to be output. When the operator selects one of the items displayed within the frame 85 in FIG. 19, the item thereof is displayed in the frame 82 as Condition 1. "Life-size" indicates printing an X-rayed human body or the like at the same size as the original body, "cost" indicates printing as inexpensively as possibly, "degree of emergency" indicates printing as quickly as possible, "gradation" indicates printing in as many tones as possible, and "resolution" indicates printing at the highest possible resolution.

The other is regarding which portion to print. In the event that the operator selects one of the items displayed in the frame 86 of FIG. 19, that item is displayed in the frame 83 as Condition 2. "All" indicates displaying of the entire image, "area of concern" indicates displaying a certain area of concern (such as the lung area, etc.), and "central area" indicates that the center portion may be clipped for printing in the event that the entire image cannot be printed.

With the Condition 1 and Condition 2 both set on the frames 82 and 83, operating the OK button registers these conditions as image forming conditions, and a table such as shown in FIG. 20 is created for each of the obtained images. This obtained image table is disclosed on the LAN 55 via the I/F 66, the CPU 64 determines the output printer by means of making reference to this obtained image table and the above-described output priority information table shown in FIG. 18, which then is set as the new output printer (S59)

For example, in the event that the operator desires life-size image output, and the desired output area is only that of the region of interest, the obtained image is of 160 $\mu$m pitch and the printer is of 80 $\mu$m pitch, so a life-size image can be obtained by enlarging the image to twice the size when outputting. At this time, the printer with the highest space resolution is comprised of 4096×5120 pixels, so there is no printer which can output the image data which is the total output of the desired obtained image, being 5400×5400 pixels. However, in the case, Condition 2 is "area of concern", so the image can be clipped to 4096×5120 pixels from the center, thus enabling printing thereof Now, in this case, a silver halide printer having space resolution of 4096×5120 pixels is set as the output printer.

On the other hand, for example, in the event that the "degree of emergency" is selected for Condition 1, a silver halide printer with short processing time for each print and with few queued jobs would be selected, and in the event that "cost" is selected for Condition 1, a dry silver printer which operates inexpensively would be selected. Thus, the output printer is determined by the output destination information table and the obtained information table, and the processing of setting the printer is performed by CPU 64 shown in FIG. 15, but description of detailed determining methods will be omitted, as a wide variety of options can be conceived.

Then, the CPU follows this decision and executes image printing (S60) in the event that necessary image processing has arisen. For example, in the above example, interpolation processing and so forth is performed in order to enlarge the obtained image to twice the size. However, it is desirable to perform such enlargement in the printer, in order to reduce the amount of data transferred over the LAN 55. Also, as another specific example, in the event that only a resolution printer is available, there is less amount of data transferred over the LAN 55 by reducing the image beforehand in step S60 and transferring this. However, taking response speed of the printer into consideration, it is desirable to complete this image processing beforehand in step S60, in order to increase throughput.

Particularly, in the event of transferring large-sized images such as radiography images over a network, it is important not to perform unnecessary transfer, in order to improve the overall performance of the system. The reason is that an abnormality such as a failed transfer may result in re-transferring of the data, and excessive load may be placed on the network in order to save the data regarding which transfer has failed. However, such predicaments can be reduced by performing clipping, sub-sampling, and so forth of the images before transfer, as described above.

Further, regarding network-type output devices, centralized control is often performed due to reasons such as piping for disposing waste fluids, but there is a relatively high change that the output device may not be available, due to the power not being turned on, being under maintenance, being out of order, and so forth. With the present embodiment, such non-available printers can be identified at the generating apparatus side, meaning that the folly of inadvertently setting such a printer as the output printer can be avoided, thus avoiding transfer errors and output waits, and enabling immediate response to deal with emergency diagnosis such as for emergency patients.

In the event that the printer switch is turned on (S61) in the print standby state, printing is performed by the printer se in the above conditions setting subroutine, or by the default printer set in step S53, thus completing printing.

Thus, with the image pick-up system according to the present embodiment, an output printer optimal for the requests of the operator can be automatically determined, thus reducing troublesome procedures on the part of the operator, and also, printing can be performed optimally under various diagnosis conditions. Also, troublesome procedures of the various settings between the image generating apparatus and a newly-installed printer connected to the LAN 55 can be reduced, allowing for optimal printing under the desired conditions at all times.

What is claimed is:

1. An image pick-up apparatus, comprising:
   a detector that detects one or more available film sizes based on device information of image output devices;
   a selecting unit adapted to select one available film size from the one or more detected film sizes;
   a display unit adapted to display film size information representing the selected film size before an exposure area of an image pick-up unit is set by an exposure area corresponding to the selected film size; and
   a control unit adapted to set the exposure area of the image pick-up unit by the exposure area corresponding to the selected film size, and to control the image pick-up unit so as to generate a digital image after the exposure area of the image pick-up unit is set by the exposure area corresponding to the selected film size.

2. An image pick-up apparatus according to claim 1, wherein the image output devices are printers.

3. An image pick-up apparatus according to claim 1, wherein the display unit further displays a maximum exposure area of the image pick-up unit and the exposure area corresponding to the selected film size.

4. An image pick-up apparatus according to claim 1, wherein the detector detects one or more available film sizes when one of the image output devices changes status.

5. An image pick-up apparatus according to claim 1, further comprising a format selecting unit adapted to select an image output format to output one or more images generated by the image pick-up unit.

6. An image pick-up apparatus according to claim 1, wherein the image pick-up unit generates a digital image by X-ray.

7. A method of generating image, comprising the steps of:
   detecting one or more available film sizes based on device information of image output devices;
   selecting one available film size from the one or more detected film sizes;
   displaying film size information representing the selected film size before an exposure area of an image pick-up unit is set by an exposure area corresponding to the selected film size;

setting the exposure area of the image pick-up unit by the exposure area corresponding to the selected film size; and controlling the image pick-up unit so as to generate a digital image after the exposure area of the image pick-up unit is set by the exposure area corresponding to the selected film size.

8. A method according to claim 7, further comprising a step of displaying a maximum exposure area of the image pick-up unit and the exposure area corresponding to the selected film size.

9. A method according to claim 7, wherein the image output devices are printers.

10. A method according to claim 7, wherein the detecting step detects one or more available film sizes when one of the image output devices changes status.

11. A method according to claim 7, further comprising a format selecting step, of selecting an image output format to output one or more images generated by the image pick-up unit.

12. A method according to claim 7, wherein the image pick-up unit generates a digital image by X-ray.

13. An image pick-up system comprising:

image output devices; and an image pick-up apparatus having an image pick-up unit, and being adapted to detect one or more available film sizes based on device information of the image output devices, to select one available film size from the one or more detected film sizes, to display film size information representing the selected film size before an exposure area of the image pick-up unit is set by an exposure area corresponding to the selected film size, to set the exposure area of the image pick-up unit by the exposure area corresponding to the selected film size, and to control the image pick-up unit so as to generate a digital image after the exposure area of the image pick-up unit is set by the exposure area corresponding to the selected film size.

* * * * *

UNITED STATES PATENT AND TRADEMARK OFFICE
CERTIFICATE OF CORRECTION

PATENT NO. : 6,335,796 B1
DATED : January 1, 2002
INVENTOR(S) : Yutaka Endo et al.

It is certified that error appears in the above-identified patent and that said Letters Patent is hereby corrected as shown below:

Title page,
Item [57], ABSTRACT,
Line 7, ""according" should read -- according to --.

Column 1,
Line 17, "an" should read -- to an --;
Line 38, "phosphoresce" should read -- phosphorescent --;
Line 39, "employs;" should read -- employs --;
Line 43, "phosphoresce" should read -- phosphorescent --; and
Line 48, "has;" should read -- has --.

Column 2,
Line 10, "served" should read -- serve --;
Line 62, "intention" should read -- invention --; and
Line 64, "system" should read -- systems --.

Column 3,
Line 6, "according" should read -- according to --;
Line 27, "according" should read -- according to --; and
Line 31, "invention." should read -- drawings. --.

Column 4,
Line 2, "FIG. 14." should read -- FIG. 14; --; and
Line 66, "and 3" should read -- and 8 --.

Column 6,
Line 46, "perform" should read -- performs --.

Column 7,
Line 7, "and" (second occurrence) should read -- an --.

Column 8,
Line 61, "The" should read -- the --; and
Line 64, "in dictates" should read -- indicates --.

UNITED STATES PATENT AND TRADEMARK OFFICE
CERTIFICATE OF CORRECTION

PATENT NO. : 6,335,796 B1
DATED : January 1, 2002
INVENTOR(S) : Yutaka Endo et al.

It is certified that error appears in the above-identified patent and that said Letters Patent is hereby corrected as shown below:

Column 10,
Line 18, "denotes" should read -- denotes a --; and
Line 66, "possibly," should read -- possible, --.

Column 11,
Line 19, "(S59)" should read -- (S59). --; and
Line 31, "thereof" should read -- thereof. --.

Column 12,
Line 16, "se" should read -- set --; and
Line 60, "image" should read -- an image --.

Signed and Sealed this

Twenty-eighth Day of January, 2003

JAMES E. ROGAN
*Director of the United States Patent and Trademark Office*